L. M. WHEAT.
WHEEL TREAD.
APPLICATION FILED DEC. 28, 1918.

1,308,153.

Patented July 1, 1919.

Inventor
L. M. Wheat
By Watson E. Coleman
Attorney

UNITED STATES PATENT OFFICE.

LEVI M. WHEAT, OF WOODVILLE, TEXAS.

WHEEL-TREAD.

1,308,153.	Specification of Letters Patent.	Patented July 1, 1919.

Application filed December 28, 1918. Serial No. 268,608.

*To all whom it may concern:*

Be it known that I, LEVI M. WHEAT, a citizen of the United States, residing at Woodville, in the county of Tyler and State of Texas, have invented certain new and useful Improvements in Wheel-Treads, of which the following is a specification, reference being had to the accompanying drawings.

This invention relates to certain improvements in wheel treads, and it is an object of the invention to provide a novel and improved device of this general character which is particularly adapted for use to extract a vehicle stalled in mud, sand, or the like.

It is also an object of the invention to provide a novel and improved device of this general character which includes members for automatically engaging a wheel structure so that as the wheel advances the tread will be engaged therewith and held thereby.

The invention consists in the details of construction and in the combination and arrangement of the several parts of my improved wheel tread whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein.

My improved tread member as herein disclosed comprises a plurality of elongated members 1 arranged in spaced relation and in parallelism with their longitudinal axes disposed transversely of the path of travel of the wheel with which the same coacts. Adjacent members 1 have their opposite end portions connected by the flexible members 2 herein disclosed as chains and the central portion 3 of each of the members 1 is outwardly bowed to receive the tread portion of the tire T comprised in a wheel structure W.

Figure 1:
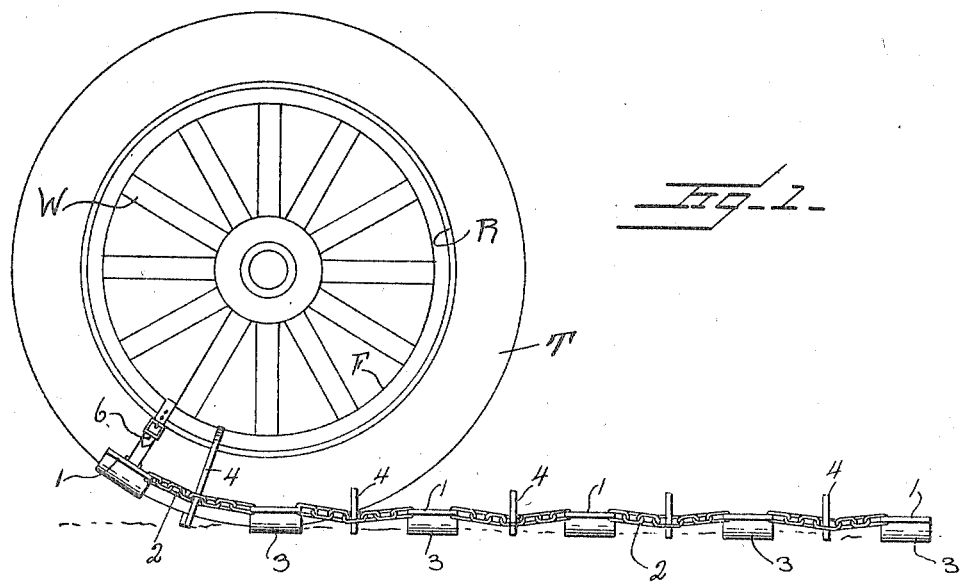
Figure 1 is a view in side elevation illustrating a tread member constructed in accordance with an embodiment of my invention and in applied position.
Figure 2:
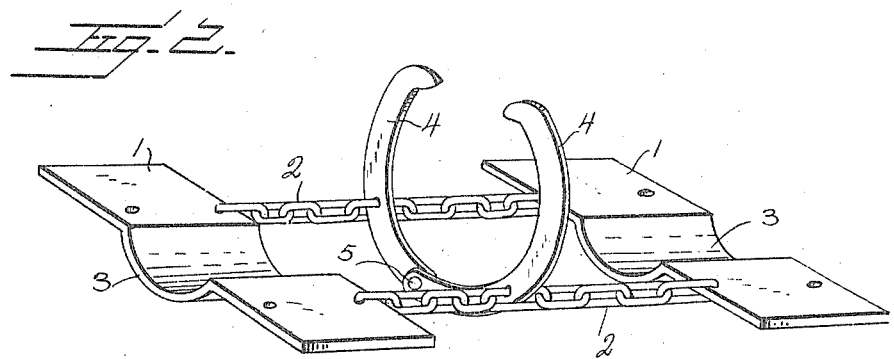
Fig. 2 is a fragmentary view in perspective of my improved tread member as herein embodied.
Figure 3:
Fig. 3 is a view in elevation of one of the wheel structure engaging members as herein employed, and in extended arrangement.

Each of the flexible members or chains substantially midway between adjacent members 1 has pivotally engaged therewith an arcuate arm 4, and the arms 4 between each pair of adjacent members 1 are transversely alined and have their inner end portions pivotally connected as indicated at 5. As is clearly illustrated in Fig. 1, the connection between each of the arms 4 and the member or chain 2 is inwardly of the inner end of said arm, so that when the arms 4 are outwardly arranged, as is particularly illustrated in Fig. 3, the inner or pivoted end portions of said arms will extend above the adjacent plates 1 or more particularly the base portions of the outbows 3.

One of the end members 1 is provided with a means as indicated at 6 whereby the same may be anchored to the wheel structure, and as herein embodied said means 6 comprises coacting straps adapted to be disposed around the tire T and the felly F of the wheel structure W.

In practice the anchoring means 6 of an end member 1 is secured to a rear wheel structure W of a vehicle, and the member as a whole extended forwardly in alinement with the wheel. It is to be noted that the means 6 extends in a direction opposite to the outbows 1, so that said outbows will be disposed in a direction away from the wheel structure in order to properly engage the tread of the tire T. As the wheel structure W advances the same will contact with the elevated inner or pivoted ends of the arms 4 and force the same downwardly, resulting in the opposite end portions of said arms 4 swinging inwardly and engaging the wheel structure W, or more particularly the rim R thereof in a manner to lock or hold the tread member of the wheel structure.

The tread member is of a length substantially equal to the periphery of the wheel structure so that the tread member may be conveniently engaged with the wheel structure throughout its length. When it is desired to remove the tread member from the wheel structure it is only necessary to swing the arms 4 outwardly and to release the means 6.

I claim:

1. A tread member comprising a plurality of spaced tread engaging members, flexible members connecting the opposite end portions of adjacent tread engaging members, one of the tread engaging members being provided with anchoring means, arcuate holding arms pivotally engaged with the flexible members inwardly of the inner ends of said arcuate arms, said arms being arranged in pairs with the arms of each pair substantially transversely alined, the inner extremities of each pair of arms being pivotally connected directly one to the other.

2. A wheel tread including side members and curved holding arms pivotally engaged with the side members inwardly of the inner ends of said curved arms, said arms being substantially transversely alined with the inner portions thereof pivotally connected directly one to the other.

3. A wheel tread including side members and curved holding arms pivotally engaged with the side members inwardly of the inner ends of said curved arms, said arms being substantially transversely alined with the inner portions thereof pivotally connected directly one to the other, said side members being flexible.

In testimony whereof I hereunto affix my signature in the presence of two witnesses.

LEVI M. WHEAT.

Witnesses:
B. C. FULLER,
W. C. SUMERLIN.